(12) United States Patent
Choksi

(10) Patent No.: US 8,149,743 B1
(45) Date of Patent: Apr. 3, 2012

(54) SYSTEM AND METHOD FOR SEAMLESSLY SWITCHING A FULL-DUPLEX SESSION TO A HALF-DUPLEX SESSION

(75) Inventor: Ojas Thakor Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1619 days.

(21) Appl. No.: 11/485,087

(22) Filed: Jul. 12, 2006

(51) Int. Cl.
 *H04L 5/16* (2006.01)
(52) U.S. Cl. ......................................... 370/296
(58) Field of Classification Search .............. 370/296, 370/276, 277, 311; 455/553.1, 552.1, 574, 455/67.11, 463
See application file for complete search history.

(56) References Cited

U.S. PATENT DOCUMENTS

| | | | |
|---|---|---|---|
| 4,712,229 A * | 12/1987 | Nakamura | ..................... 455/465 |
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,041,241 A | 3/2000 | Willey | |
| 6,119,017 A | 9/2000 | Cassidy et al. | |
| 6,178,323 B1 | 1/2001 | Nagata | |
| 6,381,467 B1 | 4/2002 | Hill et al. | |
| 6,490,452 B1 | 12/2002 | Boscovic et al. | |
| 6,526,377 B1 | 2/2003 | Bubb | |
| 7,636,327 B1 * | 12/2009 | Doran | ......................... 370/276 |
| 7,742,423 B2 * | 6/2010 | Golovinsky et al. | .......... 370/241 |
| 2002/0055364 A1 | 5/2002 | Wang et al. | |
| 2002/0071445 A1 | 6/2002 | Wu et al. | |

(Continued)

FOREIGN PATENT DOCUMENTS

EP 0 817 457 1/1998

(Continued)

OTHER PUBLICATIONS

International Search Report from International Application No. PCT/US02/31411, dated Mar. 4, 2003.

(Continued)

*Primary Examiner* — Derrick Ferris
*Assistant Examiner* — Maharishi Khirodhar

(57) ABSTRACT

A communication system that is particularly suited to switch a full duplex session to a half duplex session. The system includes a VoIP server that sets up a full duplex session; and a dispatch call controller server that receives a request to switch the full duplex session to a half duplex session; forwards the request to the target subscriber unit; receives an acceptance of the request; and sets up the half duplex session between the subscriber units. In another embodiment, the VoIP server receives the request to switch to the half duplex session; forwards the request to the target subscriber unit; receives an acceptance of the request; and instructs the dispatch call controller to set up the half duplex session. In yet another embodiment, a service broker receives the request, instructs the dispatch call controller to set up the half duplex session, and instructs the VoIP server to terminate the full duplex session. In yet another embodiment, the switch from full-to-half is network-driven instead of user-driven.

10 Claims, 14 Drawing Sheets

U.S. PATENT DOCUMENTS

| | | | |
|---|---|---|---|
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2007/0239885 A1* | 10/2007 | Vadlakonda et al. | 709/232 |
| 2007/0254692 A1* | 11/2007 | McCoy | 455/553.1 |

FOREIGN PATENT DOCUMENTS

| | | |
|---|---|---|
| EP | 0 984 608 | 3/2000 |
| JP | 2004248068 A * | 9/2004 |

OTHER PUBLICATIONS

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

International Search Report from International Application No. PCT/US03/02950, dated Nov. 6, 2003.

U.S. Appl. No. 10/277,465, filed Oct. 22, 2002 entitled "Method for Call Setup Using Short Data Bursts".

$3^{rd}$ Generation Partnership Project 2 "3GPP2", "Fast Call Set-Up," Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push-to-Tallk'", http://siliconvalley.internet.com/news/print.php/953261, printed from the World Wide Web on Jan. 27, 2003.

Schulzrinne and Rosenberg, SIP Caller Preferences and Callee Capabilities, Internet Engineering Task Force, Internet Draft, Oct. 22, 1999.

Vakil et al., "Host Mobility Protocol Extending SIP to 3G-IP Networks," Internet Engineering Task Force, Internet Draft, Oct. 1999.

Campbell and Sparks, "Control of Service Context Using SIP Request—URI", Networking Working Group, Apr. 2001.

Ericsson, www.telecomcorridor.com/wireless%20horizons/1Coyne.pdf, printed from the World Wide Web on Jun. 27, 2001.

Dirk Kutscher/Jorg Ott, "The Message Bus—A Communication and Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum System, IS-2000-3, Jul. 12, 1999.

$3^{rd}$ Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley, et al., "SDP: Session Description Protocol," Internet Engineering Task Force Request for Comment 2327, Apr. 1998.

Handley, et al., "SIP: Session Initiation Protocol," Internet Engineering Task Force Request for Comment 2543, Mar. 1999.

Fielding et al., "Hypertext Transfer Protocol—HTTP/1.1," Internet Engineering Task Force Request for Comment 2616, Jun. 1999.

Rigney et al., "Remote Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, Discussion and definitions on PoC Floor Control, Input Contribution, Doc #OMA-REQ-2003-0375-PoC_Floor_Control, Jun. 2, 2003.

OMA, "PoC Use case: Mobile—PC Example," Input Contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC Use Case-group-multimedia-scenario, May 6, 2003.

OMA, "PoC Use case: Examples of User Requirements, "Input Contribution, Doc #OMA-REQ-2003-0305-Poc Use Case, May 6, 2003.

OMA, "Inputs for PoC Requirements Document," Input Contribution, Doc #0MA-REQ-2003-0367-PoC_Input_Motorola, May 29, 2003.

OMA, "Push to Walk over Cellular (PoC)," Version 0.1.6, May 12, 2003.

U.S. Appl. No. 10/903,302, filed Jul. 31, 2004, Tillet.
U.S. Appl. No. 10/903,092, filed Jul. 31, 2004, Tillet.
U.S. Appl. No. 11/485,216, filed Jul. 12, 2006, Choksi.

* cited by examiner

SYSTEM AND METHOD FOR SEAMLESSLY SWITCHING A FULL-DUPLEX SESSION TO A HALF-DUPLEX SESSION

CROSS REFERENCE TO A RELATED APPLICATION

This application is related to U.S. patent application Ser. No. 11/485,216 entitled "System and Method for Seamlessly Switching a Half-Duplex Session to a Full-Duplex Session," filed concurrently with this application.

FIELD OF THE INVENTION

This invention relates to wireless communication systems, and in particular, to a system and method for seamlessly switching a full-duplex communication session to a half-duplex communication session.

BACKGROUND OF THE INVENTION

Wireless communication systems have become increasingly popular over the last decade. Such systems allow users to communicate with each other in various modes. For example, some systems allow users to communicate with each other by way of full-duplex voice communication links, where each link is allocated to all parties for transmitting and receiving voice communications simultaneously (e.g., a cellular or interconnect communication). Other systems allow users to communicate with each other by way of half-duplex voice communication links, where each link is allocated to a single party at a time for transmitting voice communications (e.g., a dispatch communication).

In many situations, a user initiates a communication with one or more users in a particular mode, for example, half-duplex mode or full-duplex mode, but after the communication commences, it becomes apparent to the users that the current mode of communication is not the most desirable. For example, a calling party initiates a full-duplex call with a target party for the purpose of having an elaborate discussion on a particular topic. Such call entailing an elaborate discussion on a particular topic is typically suitable for full-duplex communication. After several conversations go back and forth in a full-duplex fashion, the parties' conversation changes to a short question and answer session, which would typically be more desirable to communicate in a half-duplex mode. Alternatively, over time due to network congestion, in order to conserve network resources, it may be more desirable to carry on the conversation in half-duplex mode.

Accordingly, there is a need for a wireless communication system and method that allow for seamless switching from full-duplex mode to half-duplex mode. This would eliminate the need for the parties to terminate the current full-duplex call and initiate the commencement of a half-duplex call, and would also allow the conservation of network resources during times of network congestion.

SUMMARY OF THE INVENTION

An aspect of the invention relates to an exemplary communication system that is particularly suited to switch a current full duplex communication session to a half duplex communication session upon receiving a request and an acceptance by the initiating and target parties, respectively. The communication system comprises a network; a voice over Internet Protocol (VoIP) server coupled to the network, wherein the VoIP server is adapted to set up a full duplex communication session between first and second subscriber units (SUs). The communication system further comprises a dispatch call controller coupled to the network, wherein the dispatch call controller is adapted to receive a request to switch the full duplex communication session to a half duplex communication session from the first subscriber unit (SU) by way of the network, while the full duplex communication session is active; forward the request to the second subscriber unit (SU) by way of the network; receive an acceptance of the request from the second subscriber unit (SU) by way of the network; and set up the half duplex communication session between the first and second subscriber units (SUs).

Another aspect of the invention relates to another exemplary communication system that is particularly suited to switch a current full duplex communication session to a half duplex communication session upon receiving a request and an acceptance by the initiating and target parties, respectively. The communication system comprises a network, a dispatch call controller coupled to the network, and a VoIP server coupled to the network. The VoIP server is adapted to set up a full duplex communication session between first and second subscriber units (SUs); receive a request to switch the full duplex communication session to a half duplex communication session from the first subscriber unit (SU) by way of the network, while the full duplex communication session is active; forward the request to the second subscriber unit (SU) by way of the network; receive an acceptance of the request from the second subscriber unit (SU) by way of the network; and send an instruction to the dispatch call controller to set up the half duplex communication session.

Another aspect of the invention relates to a communication system that is particularly suited to switch a current full duplex communication session to a half duplex communication session upon receiving a request and an acceptance by the initiating and target parties, respectively. The communication system comprises a VoIP server adapted to set up a full duplex communication session between first and second subscriber units (SUs); a dispatch call controller adapted to set up a half duplex communication session between the first and second subscriber units (SUs); and a service broker adapted to receive a request to switch the full duplex session to the half duplex communication session; instruct the dispatch call controller to set up the half duplex communication session; and instruct the VoIP server to terminate the full duplex communication session.

Another aspect of the invention relates to an exemplary method of switching a full duplex communication session to a half duplex communication session. The method comprises receiving a request to switch a full duplex communication session to a half duplex communication session from a first subscriber unit (SU); forwarding the request to a second subscriber unit (SU); receiving an acceptance of the request from the second subscriber unit (SU); and setting up the half duplex communication session between the first and second subscriber units (SUs) in response to receiving the acceptance of the request.

Another aspect of the invention relates to an exemplary communication system that is particularly suited to switch a full duplex communication session to a half duplex communication session in response to network conditions. The communication system comprises a network; a VoIP server adapted to set up a full duplex communication session between first and second subscriber units (SUs); a dispatch call controller adapted to set up a half duplex communication session between first and second subscriber units (SUs); and a network load monitoring device. The network load monitoring device, in turn, is adapted to monitor the network traffic load of the network; and if the network traffic load exceeds a predetermined threshold, cause the dispatch call controller to set up the half duplex communication session; and cause the VoIP server to terminate the full duplex communication session.

Another aspect of the invention relates to an exemplary method of switching a full duplex communication session to a half duplex communication session in response to network conditions. The method comprises setting up a full duplex communication session between first and second subscriber units; monitoring a network traffic load of a network through which the full duplex session is established; and terminating the full duplex communication session and setting up a half duplex communication session between the first and second subscriber units if the network traffic load exceeds a first predetermined threshold.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
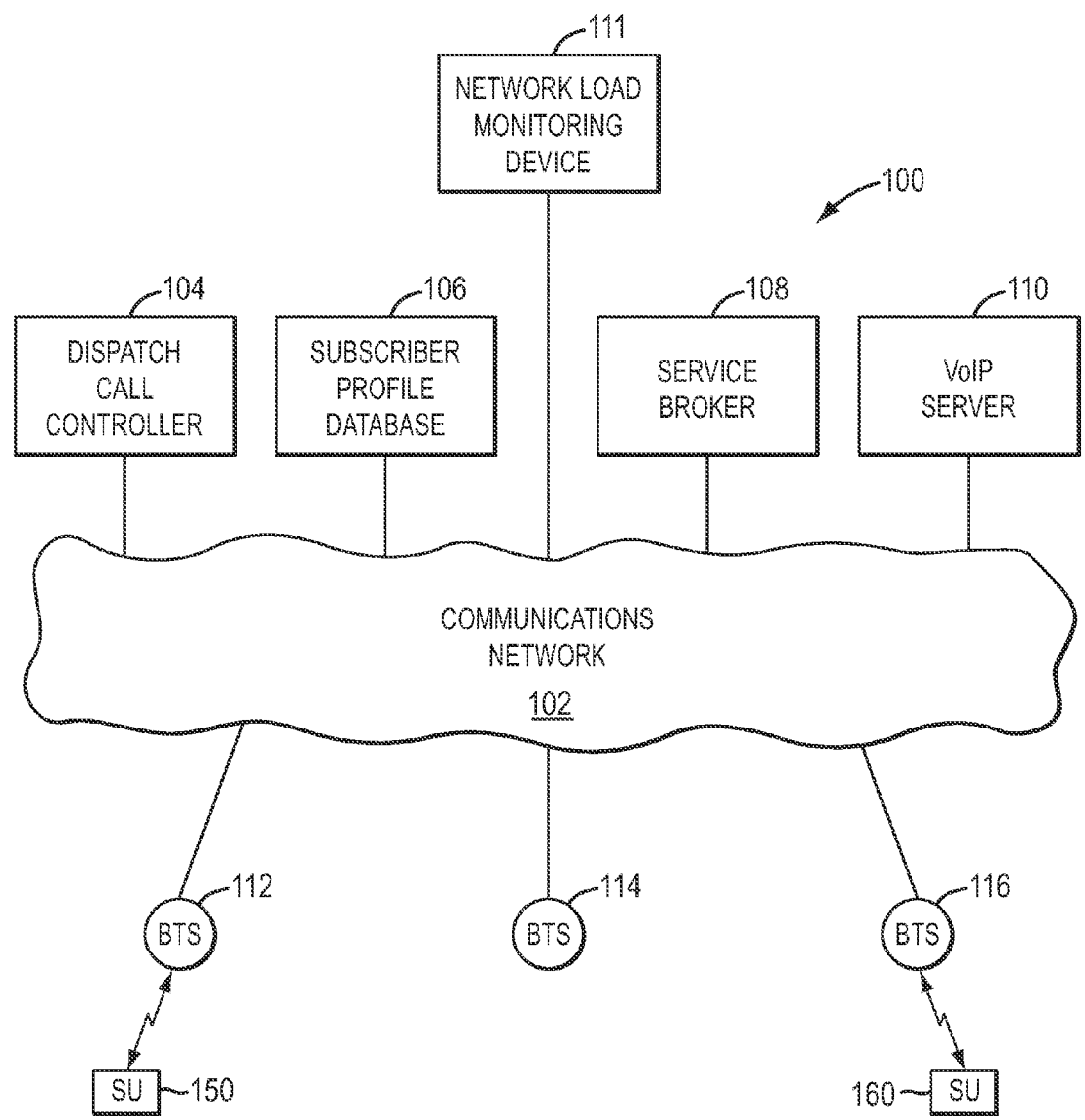
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. As discussed in more detail below, the wireless communication system 100 is particularly suited for converting an on-going full duplex voice communication session to a half duplex voice communication session.

In particular, the wireless communication system 100 comprises a communications network 102, a dispatch call controller 104 coupled to the communications network 102, a subscriber profile database 106 coupled to the communications network 102, a service broker 108 coupled to the communications network 102, a voice over Internet Protocol (VoIP) server 110 coupled to the communications network 102, and a plurality of base transceiver stations (BTS) 112, 114, and 116 coupled to the communications network 102.

More specifically, the communications network 102 facilitates communications between the various devices of the network 102, including the dispatch call controller 104, subscriber profile database 106, service broker 108, VoIP server 110, and the base transceiver stations (BTS) 112, 114, and 116. The communications network 102 may be based on any type of technology and/or protocol. For example, the communications network 102 may be based on internet protocol (IP), asynchronous transfer mode (ATM) protocol, frame relay, proprietary protocols, any combination thereof, and/or others.

The VoIP server 110 assists in the set up, control, and termination of full duplex communication sessions. In addition, as discussed in more detail below, the VoIP server also assists in the switching of full duplex communication sessions to half duplex communication sessions. The dispatch call controller 104 assists in the set up, control (e.g., channel floor control), and termination of half duplex communication sessions. In addition, as discussed in more detail below, the dispatch call controller 104 assists in the switching of full duplex communication sessions to half duplex communication sessions. The network load monitoring device 111 monitors the current network traffic load of the communications network. In addition, as discussed in more detail below, the network load monitoring device 111 also sends a request to downgrade the full duplex call to a half duplex call if the network load exceeds a first threshold, and may also send a request to upgrade the downgraded half duplex call back to the full duplex call if the network load drops below a second threshold.

The subscriber profile database 106 receives, stores, and provides subscriber profile information related to subscriber units (SUs). In this example, the subscriber profile information relates to a service package that the subscriber has subscribed that determines whether the full duplex session can be switched to a half duplex session by the communication system 100. If the parties' subscription package allows conversion of full duplex session to half duplex session, the communication system 100 is able to switch it to the half duplex session; otherwise, it will deny the switch to half duplex session. The service broker 108 serves as an intermediary between the VoIP server 110 and the dispatch call controller 104, and assists in the switching of full duplex communication sessions to half duplex communication sessions.

The wireless communication system 100 provides wireless communication services to a plurality of subscriber units (SUs), two of which are shown as SUs 150 and 160 assigned to communicate with the network 102 via base transceiver stations (BTS) 112 and 116, respectively. Although subscriber units (SUs) described herein communicate with the communication system 100 via a wireless medium, it shall be understood that subscriber units (SUs) may also communicate with the system 100 via a wired network (such as the Internet), as in the case, for example, of a dispatch-to-desktop device having half- and full-duplex communication capabilities. A subscriber unit (SU) may be any device capable of communicating in both half duplex and full duplex modes.

The following describes several exemplary methods of switching a full duplex communication session to a half duplex communication session in accordance with exemplary embodiments of the invention. Also provided is a detailed discussion of an exemplary dispatch call controller, VoIP server, service broker, network load monitoring device, and subscriber unit (SU) and their respective operations relating to the switching of a full duplex communication session to a half duplex communication session.

Figure 2:
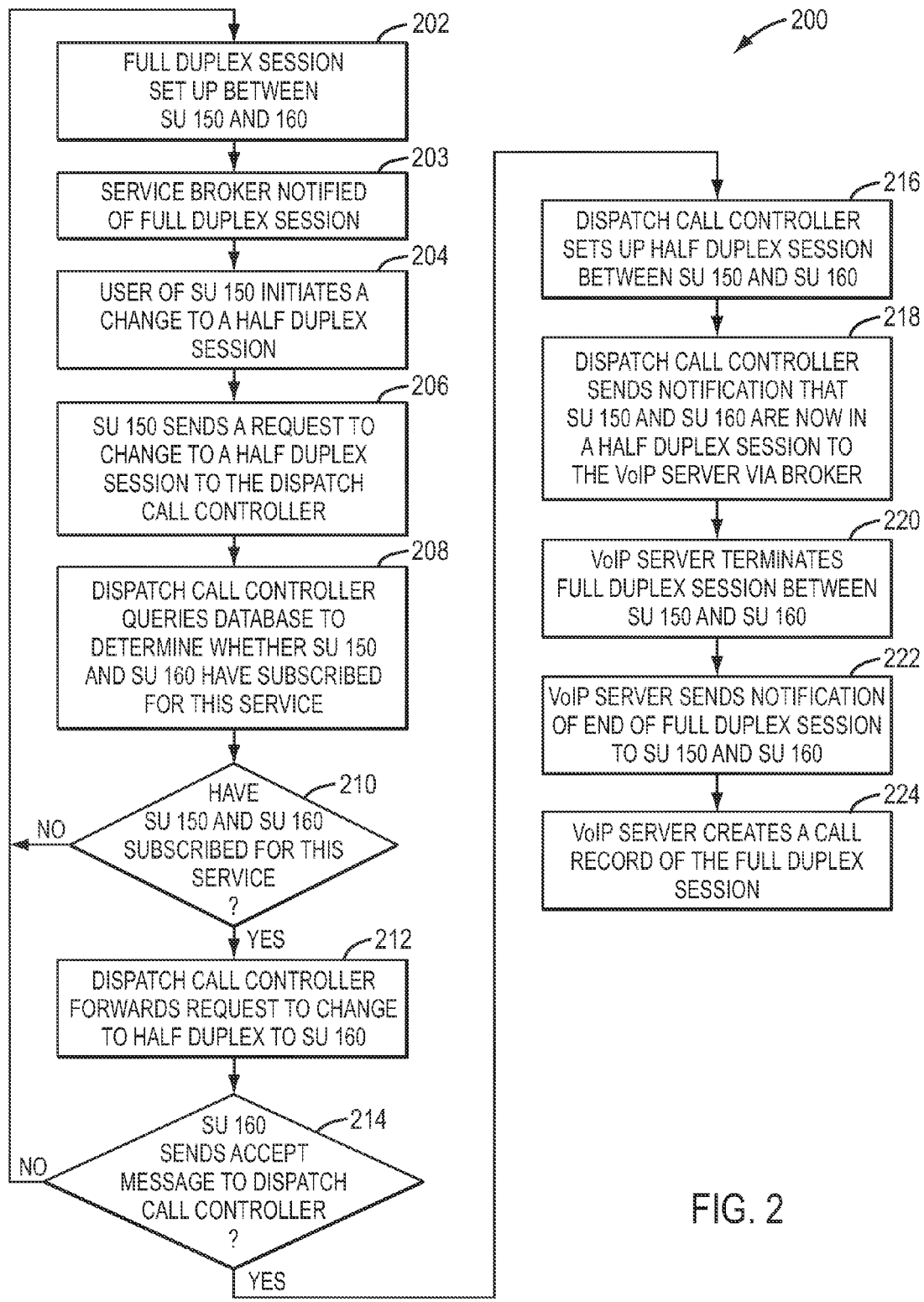
FIG. 2 illustrates a flow diagram of an exemplary method of switching a full duplex communication session to a half duplex communication session in accordance with another embodiment of the invention.

FIG. 2 illustrates a flow diagram of an exemplary method 200 of switching a full duplex communication session to a half duplex communication session in accordance with another embodiment of the invention. In this example, the wireless communication system 100 has set up a full duplex communication session between SUs 150 and 160. Also, in this example, SU 150 initiates a switch of the full duplex communication session to a half duplex communication session. Further, in this example, the dispatch call controller 104 handles the request to switch the full duplex communication session to the half duplex communication session.

According to the method 200, a full duplex communication session is set up between SUs 150 and 160 (block 202). This may be accomplished in any of a number of ways, depending on the protocol used by the wireless communication system 100. The VoIP server 110 may send a notification of the full duplex communication session to the service broker 108 via the network 102 (block 203). After the full duplex communication session has been set up, and the SUs 150 and 160 most likely have exchanged several communications via this session, the user of SU 150 initiates a switch of the full duplex communication session to a half duplex communication session (block 204). The SU 150 may have a physical and/or software button which the user can activate to initiate this switch. In a typical case, a user may want to switch a full duplex communication session to a half duplex communication session when the conversation has become a session of short questions and answers, which is typically better suited for half duplex than full duplex.

In response to the user initiating the switch from full duplex communication session to half duplex communication session, the SU 150 sends a request to change to a half duplex session to the dispatch call controller 104 by way of the base transceiver station (BTS) 112 and network 102 (block 206). In response to receiving the request, the dispatch call controller 104 queries the subscriber profile database 106 to determine whether the SUs 150 and/or 160 have subscribed to the full-to-half duplex switching service (block 208). As an example, the dispatch call controller 104 sends a subscriber profile request to the subscriber profile database 106 via the network 102, and the subscriber profile database 106 sends a response to the subscriber profile request to the dispatch call controller 104 via the network 102. The response indicates the subscription status of the SUs 150 and/or 160 for the full-to-half duplex switching service. Alternatively, if the originating SU 150 does not have a subscription to the full-to-half duplex switching service, it may not have a hard or software button available to initiate the switching request.

If the dispatch call controller 104 determines that the SUs 150 and/or 160 have not subscribed to the full-to-half duplex switching service (block 210), the current full duplex communication session continues as specified in block 202. Otherwise, if the dispatch call controller 104 determines that the SUs 150 and/or 160 have subscribed to the full-to-half duplex switching service (block 210), the dispatch call controller 104 forwards the request to the target SU 160 via the network 102 and the base transceiver station (BTS) 116 (block 212). If the target SU 160 does not accept the request to switch to the half duplex session (e.g., by sending a message denying the request to the dispatch call controller 104 or not sending a message accepting the request to the dispatch call controller within a predetermined time period) (block 214), the current full duplex session continues as specified in block 202. If the target SU 160 does not have a subscription to the full-to-half duplex switching service, it may not have a hard or software button available to accept the switching request.

Otherwise, if the target SU 160 accepts the request (e.g., by automatically or user initiating the sending of a message accepting the request to the dispatch call controller 104 via the base transceiver station (BTS) 116 and network 102), the dispatch call controller 104 sets up the half duplex communication session between the SUs 150 and 160 (block 216). The dispatch call controller 104 then sends a notification of the set up of the half duplex communication session between the SUs 150 and 160 to the VoIP server 110 via the network 102 and optionally via the service broker 108 (block 218). Alternatively, this notification of the set up of the half duplex session may be sent from any of the SUs 150 and 160 to the VoIP server 110.

In response to receiving the notification, the VoIP server 110 terminates the full duplex communication session between the SUs 150 and 160 (block 220). The VoIP server 110 sends a notification of the end of the full duplex communication session to the SUs 150 and 160 (block 222). The VoIP server 110 then creates a call record for the full duplex communication session for billing and/or other purposes (block 224).

Figure 3:
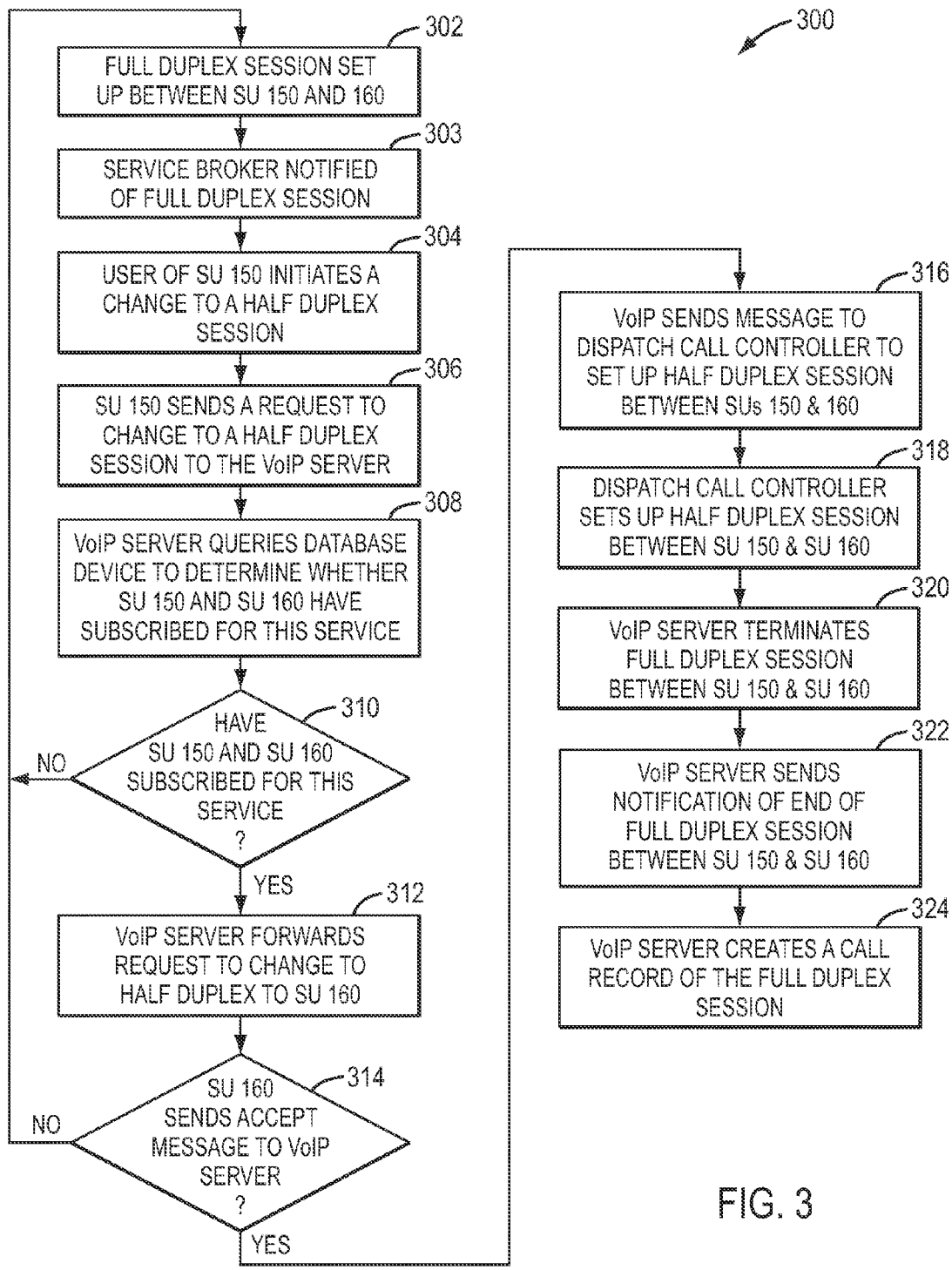
FIG. 3 illustrates a flow diagram of another exemplary method of switching a full duplex communication session to a half duplex communication session in accordance with another embodiment of the invention.

FIG. 3 illustrates a flow diagram of an exemplary method 300 of switching a full duplex communication session to a half duplex communication session in accordance with another embodiment of the invention. In this example, the wireless communication system 100 has set up a full duplex communication session between SUs 150 and 160. Also, in this example, SU 150 initiates a switch of the full duplex communication session to a half duplex communication session. Further, in this example, the VoIP server 110 handles the request to switch the full duplex session to the half duplex session.

According to the method 300, a full duplex communication session is set up between SUs 150 and 160 (block 302). This may be accomplished in any of a number of ways. The VoIP server 110 may send a notification of the full duplex communication session to the service broker 108 via the network 102 (block 303). After the full duplex communication session has been set up, and the SUs 150 and 160 most likely have exchanged several communications via this session, the user of SU 150 initiates a switch of the full duplex communication session to a half duplex communication session (block 304). In response to the user initiating the switch from full duplex session to half duplex session, the SU 150 sends a request to change to a half duplex session to the VoIP server 110 by way of the base transceiver station (BTS) 112 and network 102 (block 306).

In response to receiving the request, the VoIP server 110 queries the subscriber profile database 106 to determine whether the SUs 150 and/or 160 have subscribed to the full-to-half duplex switching service (block 308). As an example, the VoIP server 110 may send a subscriber profile request to the subscriber profile database 106 via the network 102, and the subscriber profile database 106 sends a response to the subscriber profile request to the VoIP server 110 via the network 102. The response indicates the subscription status of the SUs 150 and/or 160 for the full-to-half duplex switching service. Alternatively, if the originating SU 150 does not have a subscription to the full-to-half duplex switching service, it may not have a hard or software button available to initiate the switching request.

If the VoIP server 110 determines that the SUs 150 and/or 160 have not subscribed to the full-to-half duplex switching service (block 310), the current full duplex session continues as specified in block 302. Otherwise, if the VoIP server 110 determines that the SUs 150 and/or 160 have subscribed to the full-to-half duplex switching service (block 310), the VoIP server 110 forwards the request to the target SU 160 via the network 102 and the base transceiver station (BTS) 116 (block 312). If the target SU 160 does not accept the request to switch to the half duplex session (e.g., by sending a message denying the request to the VoIP server 110 or not sending a message accepting the request to the VoIP server 110 within a predetermined time period) (block 314), the current full duplex session continues as specified in block 302. If the target SU 160 does not have a subscription to the full-to-half duplex switching service, it may not have a hard or software button available to accept the switching request.

Otherwise, if the target SU 160 accepts the request (e.g., by automatically or user initiating the sending of a message accepting the request to the VoIP server 110 via the base transceiver station (BTS) 116 and network 102), the VoIP server 110 sends a message to set up a half duplex session to the dispatch call controller 104 via the network 102 and optionally via the service broker 108 (block 316). Alternatively, the message to set up the half duplex session may be sent from any of the SUs 150 and 160. In response, the dispatch call controller 104 sets up the half duplex communication session between the SUs 150 and 160 (block 318). The VoIP server 110 also terminates the full duplex session between the SUs 150 and 160 (block 320). The VoIP server 110 sends a notification of the end of the full duplex session to the SUs 150 and 160 (block 322). The VoIP server 110 then creates a call record for the full duplex session for billing and/or other purposes (block 324).

Figure 4:
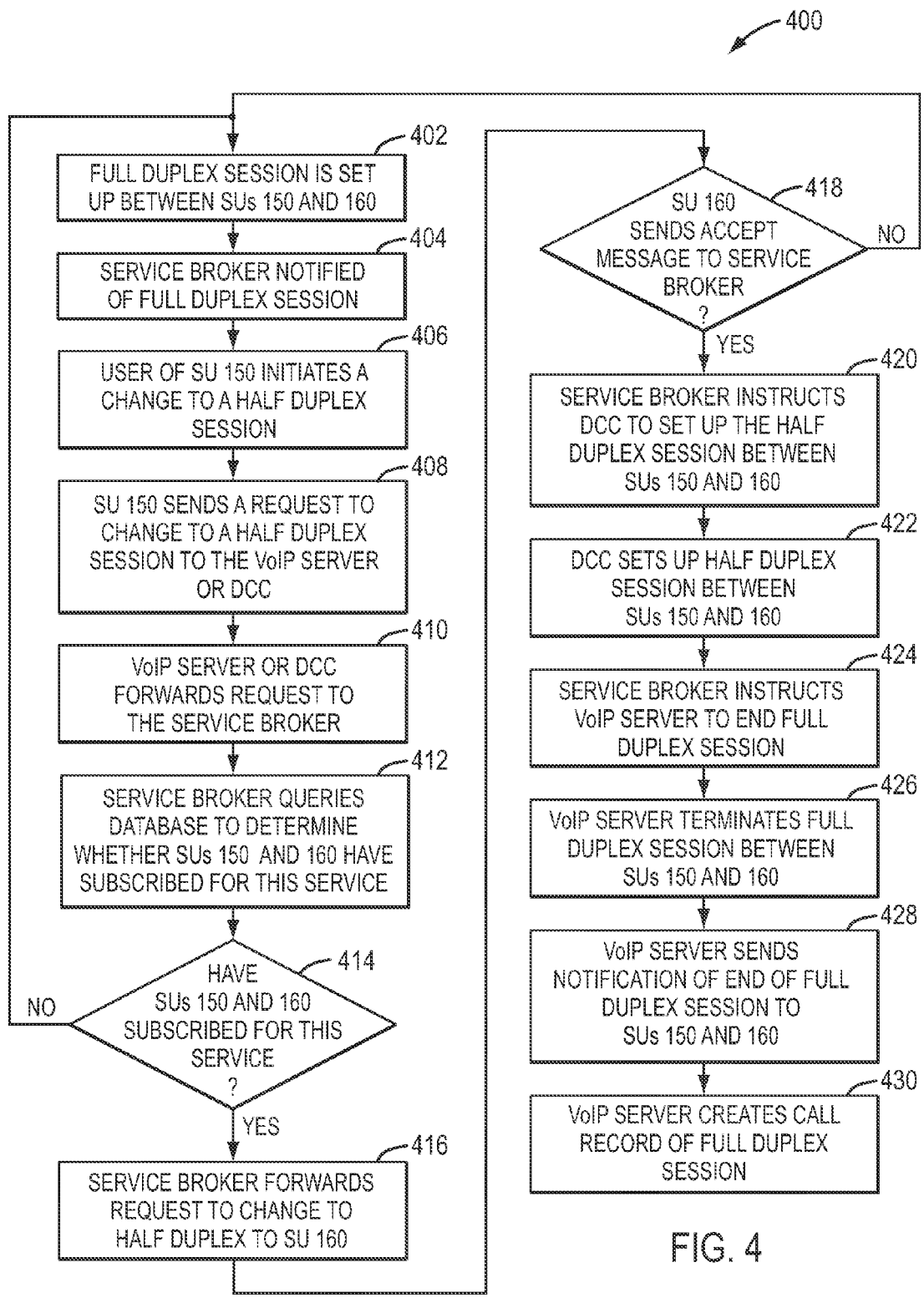
FIG. 4 illustrates a flow diagram of another exemplary method of switching a full duplex communication session to a half duplex communication session in accordance with another embodiment of the invention.

FIG. 4 illustrates a flow diagram of an exemplary method 400 of switching a full duplex communication session to a full duplex communication session in accordance with another embodiment of the invention. In this example, the wireless communication system 100 has set up a full duplex communication session between SUs 150 and 160. Also, in this example, SU 150 initiates a switch of the full duplex communication session to a half duplex communication session. Further, in this example, the service broker 108 handles the request to switch the full duplex session to the half duplex session.

According to the method 400, a full duplex communication session is set up between SUs 150 and 160 (block 402). This may be accomplished in any of a number of ways. The VoIP server 110 may send a notification of the full duplex communication session to the service broker 108 via the network 102 (block 404). After the full duplex communication session has been set up, and the SUs 150 and 160 most likely have exchanged several dispatch communications via this session, the user of SU 150 initiates a switch of the full duplex communication session to a half duplex communication session (block 406). In response to the user initiating the switch from full duplex session to half duplex session, the SU 150 sends a request to change to a half duplex session to the VoIP server 110 or the dispatch call controller 104 by way of the base transceiver station (BTS) 112 and network 102 (block 408). The VoIP server 110 or dispatch call controller 104 forwards the request to the service broker 108 via the network 102 (block 410).

In response to receiving the request, the service broker 108 queries the subscriber profile database 106 to determine whether the SUs 150 and/or 160 have subscribed to the full-to-half duplex switching service (block 412). As an example, the service broker 108 may send a subscriber profile request to the subscriber profile database 106 via the network 102, and the subscriber profile database 106 sends a response to the subscriber profile request to the service broker 108 via the network 102. The response indicates the subscription status of the SUs 150 and/or 160 for the full-to-half duplex switching service.

If the service broker 108 determines that the SUs 150 and/or 160 have not subscribed to the full-to-half duplex switching service (block 414), the current full duplex session continues as specified in block 402. Otherwise, if the service broker 108 determines that the SUs 150 and/or 160 have subscribed to the full-to-half duplex switching service (block 414), the service broker 108 forwards the request to the target SU 160 via either the VoIP server 110 or the dispatch call controller 104, and via the network 102 and the base transceiver station (BTS) 116 (block 416). If the target SU 160 does not accept the request to switch to the half duplex session (e.g., by sending a message denying the request to the service broker 108 or not sending a message accepting the request to the service broker within a predetermined time period) (block 418), the current full duplex session continues as specified in block 402.

Otherwise, if the target SU 160 accepts the request (e.g., by automatically or user initiating the sending of a message accepting the request to the service broker 108 via the base transceiver station (BTS) 116 and network 102, and via the network device that initially received the request from the originating SU 150, e.g., via either the VoIP server 110 or the dispatch call controller 104), the service broker 108 sends a message to set up a half duplex session to the dispatch call controller 104 via the network 102 (block 420). Alternatively, the message to set up the half duplex session may be sent from any of the SUs 150 and 160. In response, the dispatch call controller 104 then sets up the half duplex communication session between the SUs 150 and 160 (block 422). The service broker 108 also sends a message to terminate the full duplex communication session to the VoIP server 110 via the network 102 (block 424). Alternatively, the message to set up the half duplex session may be sent from any of the SUs 150 and 160. In response, the VoIP server 110 terminates the full duplex session between the SUs 150 and 160 (block 426). The VoIP server 110 then sends a notification of the end of the full duplex session to the SUs 150 and 160 (block 428). The VoIP server 110 then creates a call record for the full duplex session for billing and/or other purposes (block 430).

Figure 5:
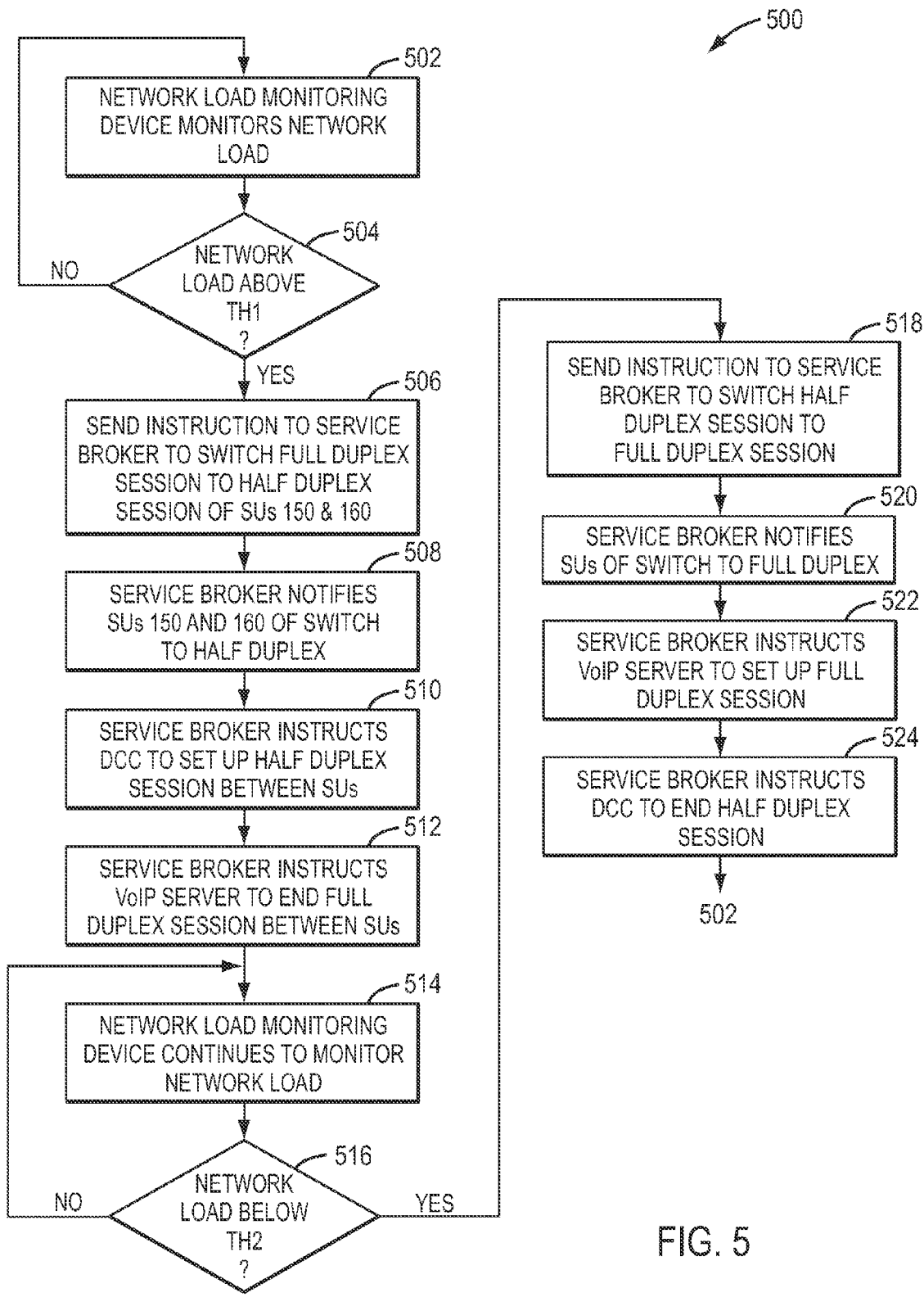
FIG. 5 illustrates a flow diagram of another exemplary method of switching a full duplex communication session to a half duplex communication session in accordance with another embodiment of the invention.

FIG. 5 illustrates a flow diagram of an exemplary method 500 of switching a full duplex communication session to a full duplex communication session in accordance with another embodiment of the invention. In the prior examples, the user of SU 150 initiated the switch from full duplex to half duplex. However, there may be situations where the network may initiate the switch from full duplex to half duplex in response to, for example, network congestion. In this example, the wireless communication system 100 has set up a full duplex communication session between SUs 150 and 160. Further, in this example, the service broker 108 handles the request to switch the full duplex session to the half duplex session. It shall be understood that the dispatch call controller 104 and the VoIP server 110 may also handle the request to switch the full duplex session to the half duplex session.

According to the method 500, the network load monitoring device 111 continues to monitor the traffic load of the communications network 102 (block 502). In monitoring the network traffic load, the network load monitoring device 111 determines whether the network traffic load exceeds a predetermined threshold TH1 (block 504). If the network load monitoring device 111 determines that the current network load has not exceeded the predetermined threshold TH1, the network load monitoring device 111 continues to monitor the traffic load of the communications network 102 as per block 502. If, on the other hand, the network load monitoring device 111 determines that the current network load exceeds the predetermined threshold TH1, the network load monitoring device 111 sends an instruction to switch the full duplex session of SUs 150 and 160 to a half duplex session to the service broker 108 by way of the network 102 (block 506). Alternatively, the network load monitoring device 111 may send a request to the service broker 108 to downgrade a certain percentage of full duplex sessions, and in response, the service broker determines, based on the services packages subscribed queried from the subscriber profile database 106, which sessions to convert from full duplex to half duplex.

It shall be understood that the network load monitoring device 111 may downgrade full duplex sessions to half duplex sessions of other SUs of the communication system 100. In addition, the downgrading of the full duplex sessions may be based on the quality of service (QoS) purchased by the SUs. For example, for SUs that have purchased premium QoS plans, the network load monitoring device 111 may not cause their full duplex sessions to be downgraded to half duplex sessions. For other SUs, such as SUs 150 and/or 160 in this example, that have purchased a more economical QoS plan, the network load monitoring device 111 may cause their full duplex sessions to be downgraded to half duplex sessions.

In response to receiving the instruction to switch the full duplex session of SUs 150 and 160 to a half duplex session, the service broker 108 notifies the SUs 150 and 160 that their full duplex session will be downgraded to a half duplex session (block 508). The notification can be via the VoIP server 110 or the dispatch call controller 104. The service broker 108 also sends an instruction to the dispatch call controller 104 to set up the half duplex session between the SUs 150 and 160 (block 510); which the dispatch call controller 104, in turn, responds by setting up the half duplex session. Alternatively, the instruction message to set up the half duplex session may be sent from any of the SUs 150 and 160. The service broker 108 also sends an instruction to the VoIP server 110 to terminate the full duplex session between the SUs 150 and 160 (block 512); which the VoIP server 110, in turn, responds by terminating the full duplex session and creating a call detail record for the full duplex session. Alternatively, the message to set up the half duplex session may be sent from any of the SUs 150 and 160. The SUs 150 and 160 are now communicating with each other in a half duplex mode.

After downgrading the full duplex session of SUs 150 and 160 to the half duplex session, the network load monitoring device 111 continues to monitor the traffic load of the communications network 102 (block 514). In monitoring the network traffic load, the network load monitoring device 111 determines whether the network traffic load has fallen below a predetermined threshold TH2 (block 516). The predetermined threshold TH2 may be the same or different than the previously-discussed threshold TH1. It may be preferable that the threshold TH2 is less than TH1 to prevent the network loading monitoring device 111 to cause frequent switches between full and half duplex sessions if the network traffic load is varying around TH1.

If the network load monitoring device 111 determines that the current network load has not fallen below the predetermined threshold TH2, the network load monitoring device 111 continues to monitor the traffic load of the communications network 102 as per block 514. If, on the other hand, the network load monitoring device 111 determines that the current network load has fallen below the predetermined threshold TH2, the network load monitoring device 111 sends an instruction to switch the half duplex session of SUs 150 and 160 back to the full duplex session to the service broker 108 by way of the network 102 (block 518). In this way, if the network congestion reduces, the session is upgraded again to full duplex.

In response to receiving the instruction to switch the half duplex session of SUs 150 and 160 back to the full duplex session, the service broker 108, either via the VoIP server 110 or dispatch call controller 104, notifies the SUs 150 and 160 that their half duplex session will be upgraded back to the full duplex session (block 518). The service broker 108 also sends an instruction to the VoIP server 110 to set up the full duplex session between the SUs 150 and 160 (block 522); which the VoIP server 110, in turn, responds by setting up the full duplex session. The service broker 108 also sends an instruction to the dispatch call controller 104 to terminate the half duplex session between the SUs 150 and 160 (block 512); which the dispatch call controller 104, in turn, responds by terminating the half duplex session and creating a call detail record for the half duplex session. The SUs 150 and 160 are now back communicating with each other in a full duplex mode.

Figure 6A:
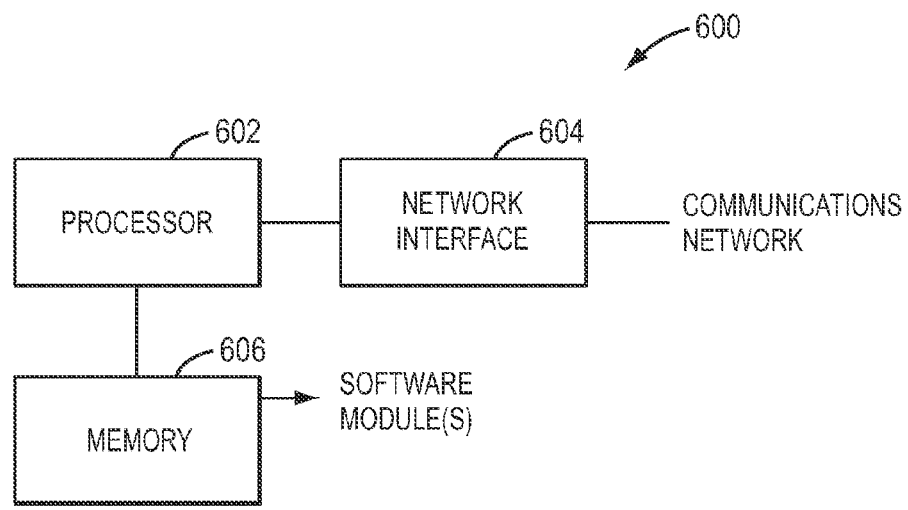
FIG. 6A illustrates a block diagram of an exemplary dispatch call controller in accordance with another embodiment of the invention.

FIG. 6A illustrates a block diagram of an exemplary dispatch call controller 600 in accordance with another embodiment of the invention. The dispatch call controller 600 may be an exemplary detailed version of the dispatch call controller 104 of wireless communication system 100. As detailed below, the dispatch call controller 600 assists in the switching of a full duplex communication session to a half duplex communication session.

In particular, the dispatch call controller 600 comprises a processor 602, a network interface 604 coupled to the processor 602, and a memory 606 coupled to the processor 602. The processor 602, under the control of one or more software module(s) stored in the memory 606, performs the various operations of the dispatch call controller 600 such as assisting in the switching of a full duplex communication session to a half duplex communication session. The network interface 604 provides an interface to the communications network 102 for transmitting communications thereto and receiving communications therefrom. The memory 606 could be any computer readable medium (e.g., volatile or non-volatile memory) capable of storing one or more software module(s) that controls the processor 602 in performing its various operations. The following describes a couple of exemplary methods of assisting in the switching of a full duplex communication session to a half duplex communication session.

Figure 6C:
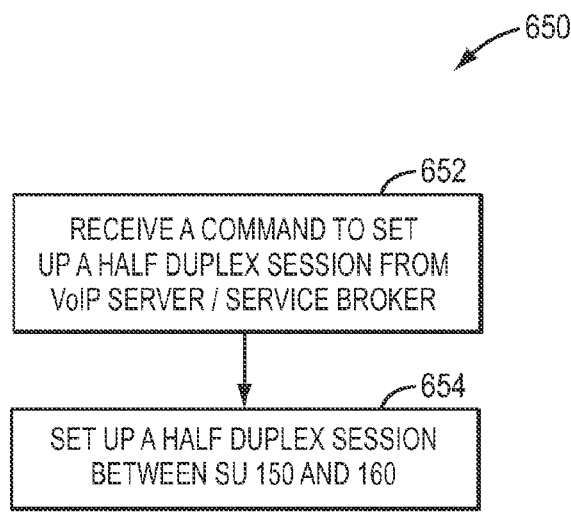
FIG. 6C illustrates a flow diagram of another exemplary method of assisting in the switching of a full duplex communication session to a half duplex communication session performed by the dispatch call controller in accordance with another embodiment of the invention.
Figure 6B:
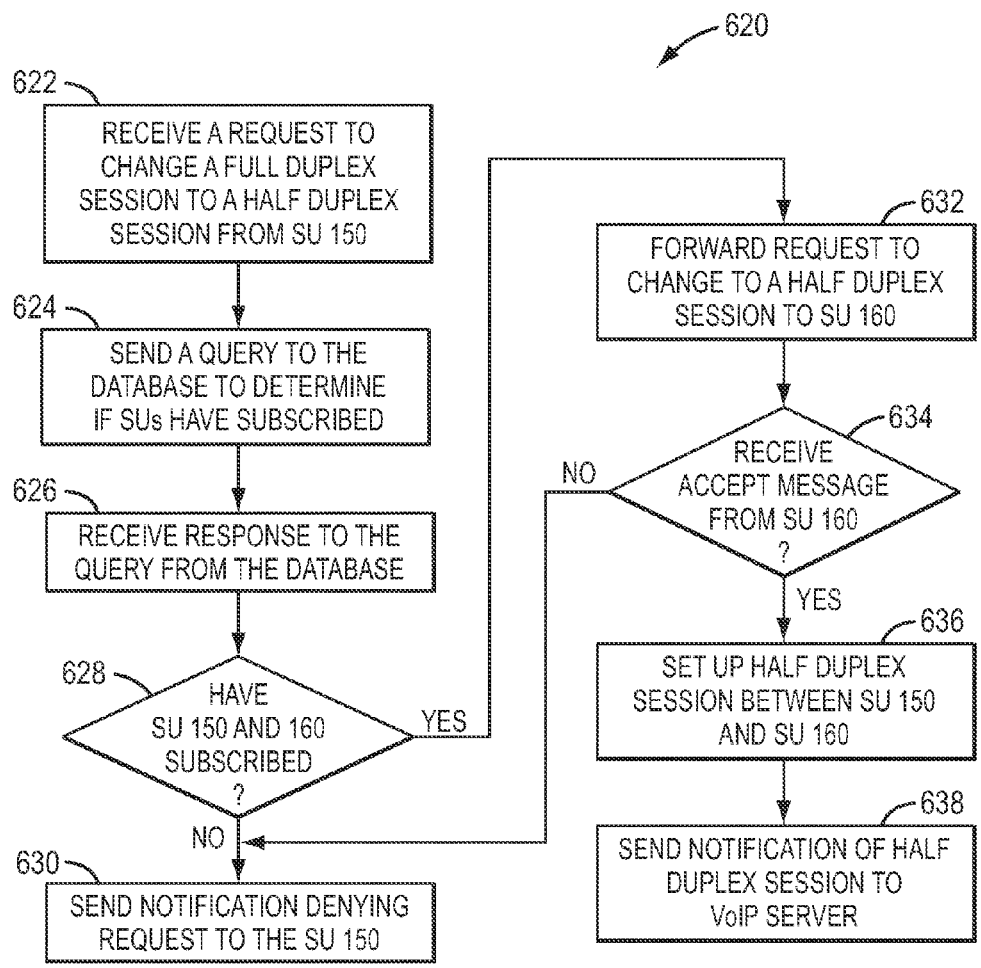
FIG. 6B illustrates a flow diagram of an exemplary method of assisting in the switching of a full duplex communication session to a half duplex communication session performed by the dispatch call controller in accordance with another embodiment of the invention.

FIG. 6B illustrates a flow diagram of an exemplary method 620 of assisting in the switching of a full duplex communication session to a half duplex communication session performed by the dispatch call controller 600 in accordance with another embodiment of the invention. As in the previous examples, SU 150 is initiating a request to switch a current full duplex communication session to a half duplex communication session. Further, in this example, the dispatch call controller 600 is primarily involved in the switching of the full duplex session to the half duplex session.

According to the method 620, the processor 602 receives a request to change a full duplex session to a half duplex session from the SU 150 by way of the network interface 604 (block 622). In response to receiving the request, the processor 602 sends a query to the subscriber profile database 106 via the network interface 604 to determine whether the originating SU 150 and/or the target SU 160 have subscribed to the full-to-half duplex switching service (block 624). Thereafter, the processor 602 receives the response to the query from the subscriber profile database 106 by way of the network interface 604 (block 626).

If the processor 602, based on the query response, determines that the SU 150 and/or the target SU 160 have not subscribed to the full-to-half duplex switching service (block 628), the processor 602 sends a notification denying the switching request to the SU 150 by way of the network interface 604 (block 630). On the other hand, if the processor 602 determines that the SU 150 and/or SU 160 have subscribed to the full-to-half duplex switching service (block 628), the processor 602 forwards the request to change to a half duplex session to the target SU 160 by way of the network interface 604 (block 632). The request may cause the target SU 160 to generate a visual, audio, and/or vibrating notification to the user. The processor 602 may also cause the originating SU to generate a visual, audio, and/or vibrating notification informing the user that the target SU 160 is being notified of the request.

After forwarding the request to the target SU 160, the processor 602 determines whether the target SU 160 has accepted the request to switch to a half duplex session (block 634). As an example, if the target SU 160 accepts, the processor 602 receives an acceptance message from the target SU 160 by way of the network interface 604. If the target SU 160 does not accept, the processor 602 may receive a deny request message from the target SU 160 via the network interface 604, or may not receive any message from the target SU 160 within a predetermined time period.

If the target SU 160 does not accept, the processor 602 sends a notification denying the switching request to the originating SU 150 via the network interface 604 (block 630). If, on the other hand, the target SU 160 accepts the request to switch to a half duplex session, the processor 602 sets up the half duplex session between the SUs 150 and 160 (block 636). The processor 602 also sends a notification of the switch to the half duplex session to the VoIP server 110 via the network interface 604 and optionally via the service broker 108 (block 638). This notification serves to instruct the VoIP server 110 to terminate the full duplex communication session.

FIG. 6C illustrates a flow diagram of another exemplary method 650 of assisting in the switching of a full duplex communication session to a half duplex communication session performed by the dispatch call controller 600 in accordance with another embodiment of the invention. As in the previous examples, the SU 150 is initiating a request to switch a current full duplex communication session to a half duplex communication session. Further, in this example, the VoIP server 110 or the service broker 108 is primarily involved in the switching of the full duplex session to the half duplex session, and the dispatch call controller 600 is responding to either of them.

According to the method 650, the processor 602 receives a command to set up a half duplex session from the VoIP server 110 or service broker 108 via the network interface 604 (block 652). In response to the command, the processor 602 sets up a half duplex session between SU 150 and SU 160 (block 654). In the case of the service broker 108, the processor 602 may have initially received the full-to-half switching request from the originating SU 150 via the network interface 604, and forwards the request to the service broker 108 via the network interface 604 for processing.

Figure 7A:
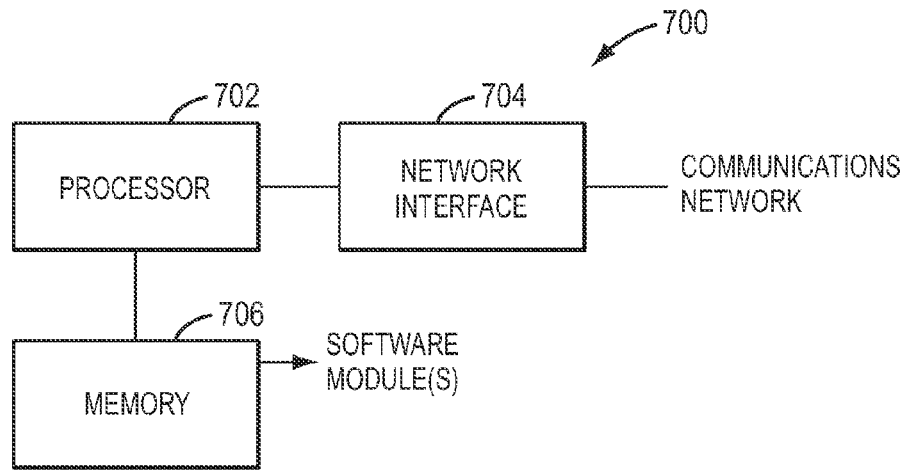
FIG. 7A illustrates a block diagram of an exemplary voice over Internet Protocol (VoIP) server in accordance with another embodiment of the invention.

FIG. 7A illustrates a block diagram of an exemplary voice over Internet Protocol (VoIP) server 700 in accordance with another embodiment of the invention. The VoIP server 700 may be an exemplary detailed version of the VoIP server 110 of wireless communication system 100. As detailed below, the VoIP server 700 assists in the switching of a full duplex communication session to a half duplex communication session.

In particular, the VoIP server 700 comprises a processor 702, a network interface 704 coupled to the processor 702, and a memory 706 coupled to the processor 702. The processor 702, under the control of one or more software module(s) stored in the memory 706, performs the various operations of the VoIP server 700 such as assisting in the switching of a full duplex communication session to a half duplex communication session. The network interface 704 provides an interface to the communications network 102 for transmitting communications thereto and receiving communications therefrom. The memory 706 could be any computer readable medium (e.g., volatile or non-volatile memory) capable of storing one or more software module(s) that controls the processor 702 in performing its various operations. The following describes a couple of exemplary methods of assisting in the switching of a full duplex session to a half duplex session.

Figure 7B:
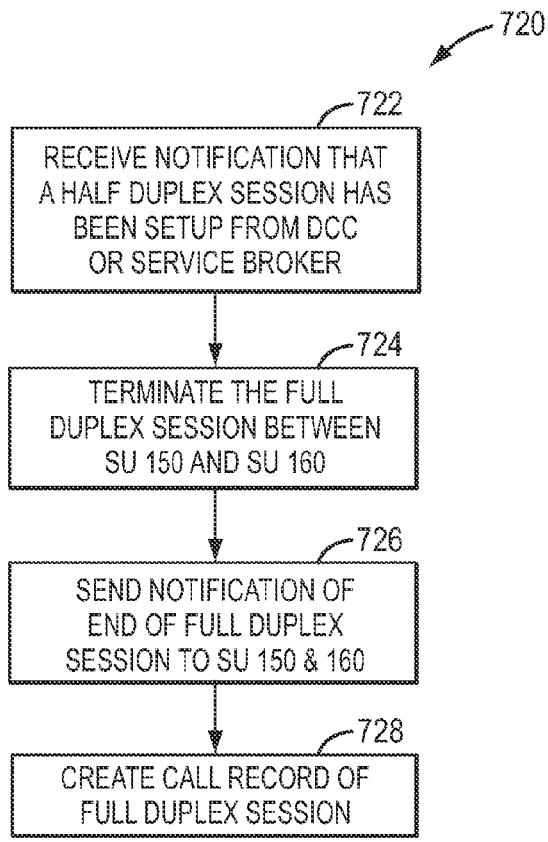
FIG. 7B illustrates a flow diagram of an exemplary method of assisting in the switching of a full duplex communication session to a half duplex communication session performed by the VoIP server in accordance with another embodiment of the invention.

FIG. 7B illustrates a flow diagram of an exemplary method 720 of assisting in the switching of a full duplex communication session to a half duplex communication session performed by the VoIP server 700 in accordance with another embodiment of the invention. As in the previous examples, SU 150 is initiating a request to switch a current full duplex communication session to a half duplex communication session. Further, in this example, the dispatch call controller 104 or service broker 108 is primarily involved in the switching of the full duplex session to the half duplex session, and the VoIP server 700 is responding to either of them.

According to the method 720, the processor 702 receives a notification that a half duplex session has been setup or is to be set up from the dispatch call controller 104 or service broker 108 via the network interface 704 (block 722). In response to the notification, the processor 702 terminates the full duplex communication session between the SUs 150 and 160 (block 724). The processor 704 then sends a notification of the termination of the full duplex session to the SUs 150 and 160 via the network interface 704 (block 726). The processor 704 then creates a call record of the full duplex communication session (block 728).

Figure 7C:
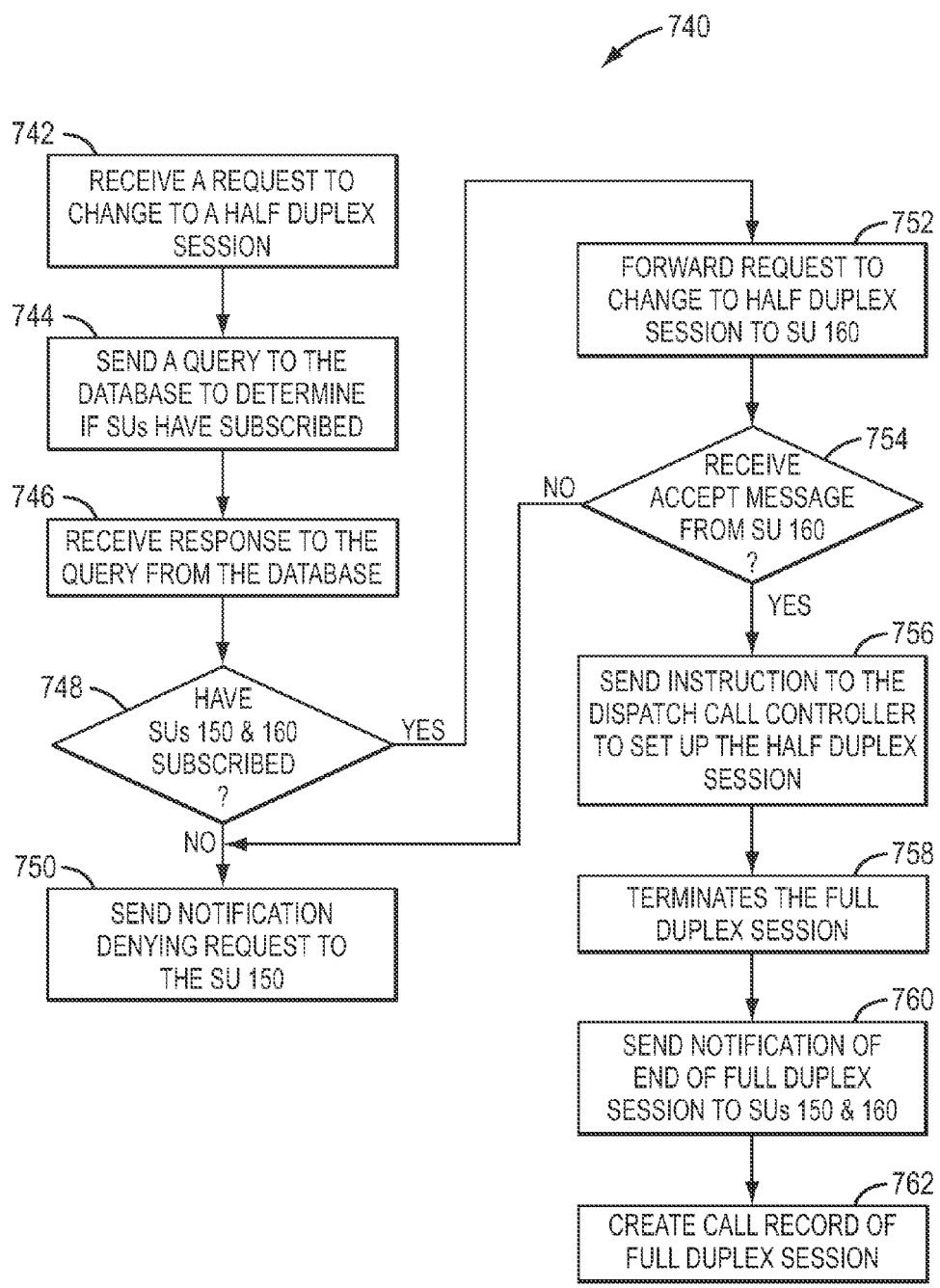
FIG. 7C illustrates a flow diagram of another exemplary method of assisting in the switching of a full duplex communication session to a half duplex communication session performed by the VoIP server in accordance with another embodiment of the invention.

FIG. 7C illustrates a flow diagram of another exemplary method 740 of assisting in the switching of a full duplex communication session to a half duplex communication session performed by the VoIP server 700 in accordance with another embodiment of the invention. As in the previous examples, SU 150 is initiating a request to switch a current full duplex communication session to a half duplex communication session. Further, in this example, the VoIP server 700 is primarily involved in the switching of the full duplex session to the half duplex session.

According to the method 740, the processor 702 receives a request to change a full duplex session to a half duplex session from the SU 150 by way of the network interface 704 (block 742). In response to receiving the request, the processor 702 sends a query to the subscriber profile database 106 via the network interface 704 to determine whether the originating SU 150 and/or the target SU 160 have subscribed to the full-to-half duplex switching service (block 744). Thereafter, the processor 702 receives the response to the query from the subscriber profile database 106 by way of the network interface 704 (block 746).

If the processor 702, based on the query response, determines that the SU 150 and/or the target SU 160 have not subscribed to the full-to-half duplex switching service (block 748), the processor 702 sends a notification denying the switching request to the SU 150 by way of the network interface 704 (block 750). If, on the other hand, the processor 702 determines that the SU 150 and/or SU 160 have subscribed to the full-to-half duplex switching service (block 748), the processor 702 forwards the request to change to a half duplex session to the target SU 160 by way of the network interface 704 (block 752). The request may cause the target SU 160 to generate a visual, audio, and/or vibrating notification to the user. The processor 702 may also cause the originating SU 150 to generate a visual, audio, and/or vibrating notification informing the user that the target SU 160 is being notified of the request.

After forwarding the request to the target SU 160, the processor 702 determines whether the target SU 160 has accepted the request to switch to a half duplex session (block 754). As an example, if the target SU 160 accepts, the processor 702 receives an acceptance message from the target SU 160 by way of the network interface 704. If the target SU 160 does not accept, the processor 702 may receive a deny request message from the target SU 160 via the network interface 704, or may not receive any message from the target SU 160 within a predetermined time period.

If the target SU 160 does not accept, the processor 702 sends a notification denying the switching request to the originating SU 150 via the network interface 704 (block 750). If, on the other hand, the target SU 160 accepts the request to switch to a half duplex session, the processor 702 sends an instruction to set up the half duplex session between the SUs 150 and 160 to the dispatch call controller 104 via the network interface 704 and optionally via the service broker 108 (block 756). Upon reception of a successful setup of the half duplex session, the processor 702 then terminates the full duplex session (block 758), and sends a notification of such to the SUs 150 and 160 (block 760). The processor 702 then creates a call record of the full duplex session (block 762).

Figure 8A:
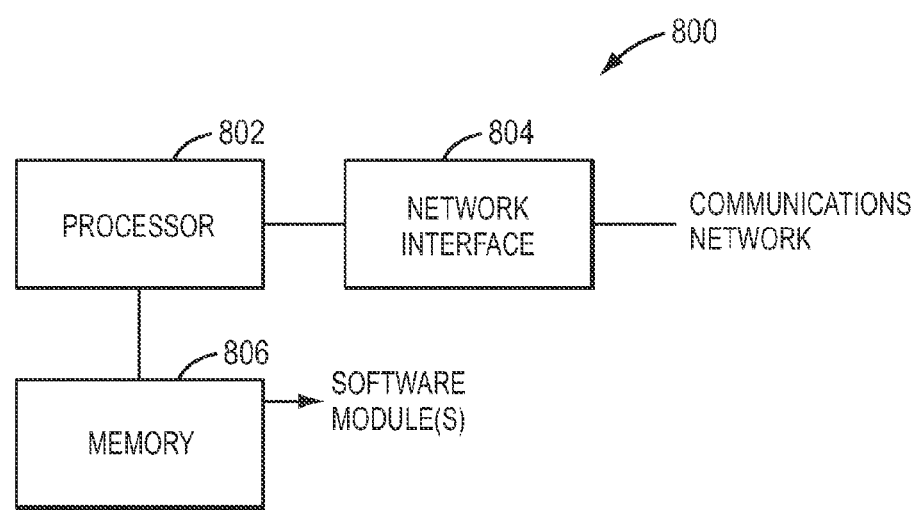
FIG. 8A illustrates a block diagram of an exemplary service broker in accordance with another embodiment of the invention.

FIG. 8A illustrates a block diagram of an exemplary service broker 800 in accordance with another embodiment of the invention. The service broker 800 may be an exemplary detailed version of the service broker 108 previously discussed with reference to the wireless communication system 100. As detailed below, the service broker 800 controls the switching of a full duplex communication session to a half duplex communication session, and vice-versa. The switching may be prompted by an SU or a network device.

In particular, the service broker 800 comprises a processor 802, a network interface 804 coupled to the processor 802, and a memory 806 coupled to the processor 802. The processor 802, under the control of one or more software module(s) stored in the memory 806, performs the various operations of the service broker 800 such as assisting in the switching of a full duplex communication session to a half duplex communication session, and vice-versa. The network interface 804 provides an interface to the communications network 102 for transmitting communications thereto and receiving communications therefrom. The memory 806 could be any computer readable medium (e.g., volatile or non-volatile memory) capable of storing one or more software module(s) that controls the processor 802 in performing its various operations. The following describes an exemplary method of assisting in the switching of a full duplex session to a half duplex session, and vice-versa.

Figure 8B:
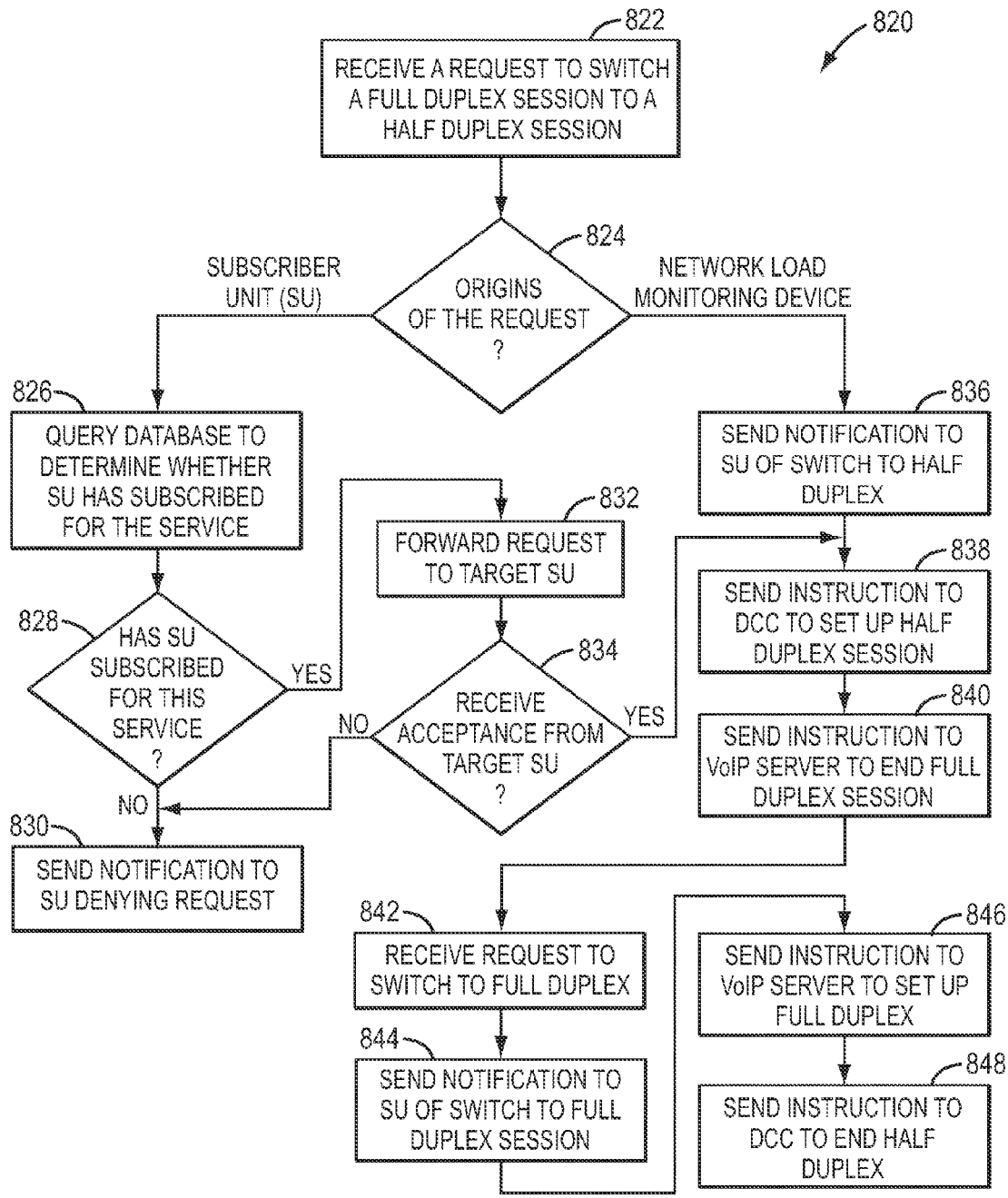
FIG. 8B illustrates a block diagram of an exemplary method of assisting in the switching of a full duplex communication session to half duplex communication performed by the service broker in accordance with another embodiment of the invention.

FIG. 8B illustrates a block diagram of an exemplary method 820 of assisting in the switching of a full duplex communication session to half duplex communication performed by the service broker 800 in accordance with another embodiment of the invention. In this example, two SUs are currently in a full duplex communication session. According to the method 820, the processor 802 receives a request to switch the full duplex communication session to a half duplex communication session by way of the network interface 804 (block 822). The processor 802 then determines whether the origin of the request is from one of the SUs to the full duplex session (e.g., via a dispatch call controller or VoIP server) or from a network load monitoring device (block 824).

If the request came from one of the SUs to set up the full duplex session, the processor 802 queries a database stored locally in the memory 806 or in another network device to determine whether the one or more SUs to the full duplex session have subscribed to the full-to-half duplex switching service (block 826). If the processor 802 determines that the one or more SUs have not subscribed to the full-to-half duplex switching service (block 828), the processor 802 sends a notification denying the request to the one or more SUs via the network interface 802 (block 830). If, on the other hand, the processor 802 determines that the one or more SUs have subscribed to the full-to-half duplex switching service (block 828), the processor 802 forwards the request to the target SU (block 832).

The processor 802 then determines whether it has received an acceptance to the request from the target SU (block 834). If the processor 802 has not received an acceptance to the request after a predetermined time period after sending the request, or if the processor 802 receives a messaging denying the request from the target SU via the network interface 804, the processor 802 sends a notification denying the request to the requesting SU via the network interface 804 (block 830). If, on the other hand, the processor 802 receives an acceptance of the request from the target SU via the network interface 804, the processor 802 sends an instruction to the dispatch call controller to set up the half duplex communication session (block 838). The processor 802 also sends an instruction to the VoIP server to terminate the full duplex communication session (block 840).

Returning back to block 824, if the processor 802 determines that the origin of the request to switch the full duplex session to a half duplex session is the network load monitoring device (e.g., because there is too much network congestion), the processor 802 sends a notification indicating a forced switch to a half duplex session to the one or more SUs via the network interface 804 and VoIP server (block 836). Alternatively, the processor 802 receive a notification to downgrade a certain percentage of full duplex sessions from the network load monitoring device via the network interface 804. The processor 802 then, based on the service package subscription data of active SUs stored in the memory 806, determines the sessions that will be downgraded to half duplex. The processor 802 then sends an instruction to set up the half duplex communication session to the dispatch call controller via the network interface 804 (block 838). The processor 802 also sends an instruction to terminate the full duplex communication session to the VoIP server via the network interface 804 (block 840).

The processor 802 may subsequently receive another request to switch back to the full duplex communication session from the network load monitoring device via the network interface 804 (block 842). This may be the case where the network load condition has improved to a certain degree. The processor 802 then sends a notification indicating that the half duplex session will be upgraded to a full duplex session to the one or more SUs via the network interface 804 and the dispatch call controller (block 844). The processor 802 also sends an instruction to the VoIP server to set up the full duplex communication session (block 846). The processor 802 further sends an instruction to the dispatch call controller to terminate the half duplex communication session (block 848).

Figure 9A:
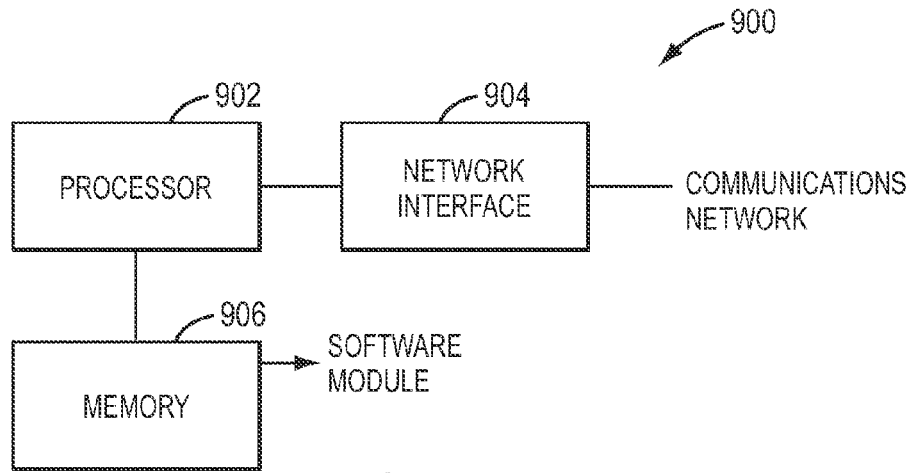
FIG. 9A illustrates a block diagram of an exemplary network load monitoring device in accordance with another embodiment of the invention.

FIG. 9A illustrates a block diagram of an exemplary network load monitoring device 900 in accordance with another embodiment of the invention. The network load monitoring device 900 may be an exemplary detailed version of the network load monitoring device 111 previously discussed with reference to the wireless communication system 100. As discussed below, the network load monitoring device 900 monitors the current load of the network, and may downgrade certain full duplex sessions to half duplex sessions if the network load exceeds a certain threshold, and may upgrade certain half duplex session to full duplex sessions if the network load falls below a certain threshold.

In particular, the network load monitoring device 900 comprises a processor 902, a network interface 904 coupled to the processor 902, and a memory 906 coupled to the processor 902. The processor 902, under the control of one or more software module(s) stored in the memory 906, performs the various operations of the network load monitoring device 900 such as causing the switching of a full duplex communication session to a half duplex communication session, and vice-versa, in response to network load conditions. The network interface 904 provides an interface to the communications network 102 for transmitting communications thereto and receiving communications therefrom. The memory 906 could be any computer readable medium (e.g., volatile or non-volatile memory) capable of storing one or more software module(s) that controls the processor 902 in performing its various operations. The following describes an exemplary method of assisting in the switching of a full duplex session to a half duplex session, and vice-versa.

Figure 9B:
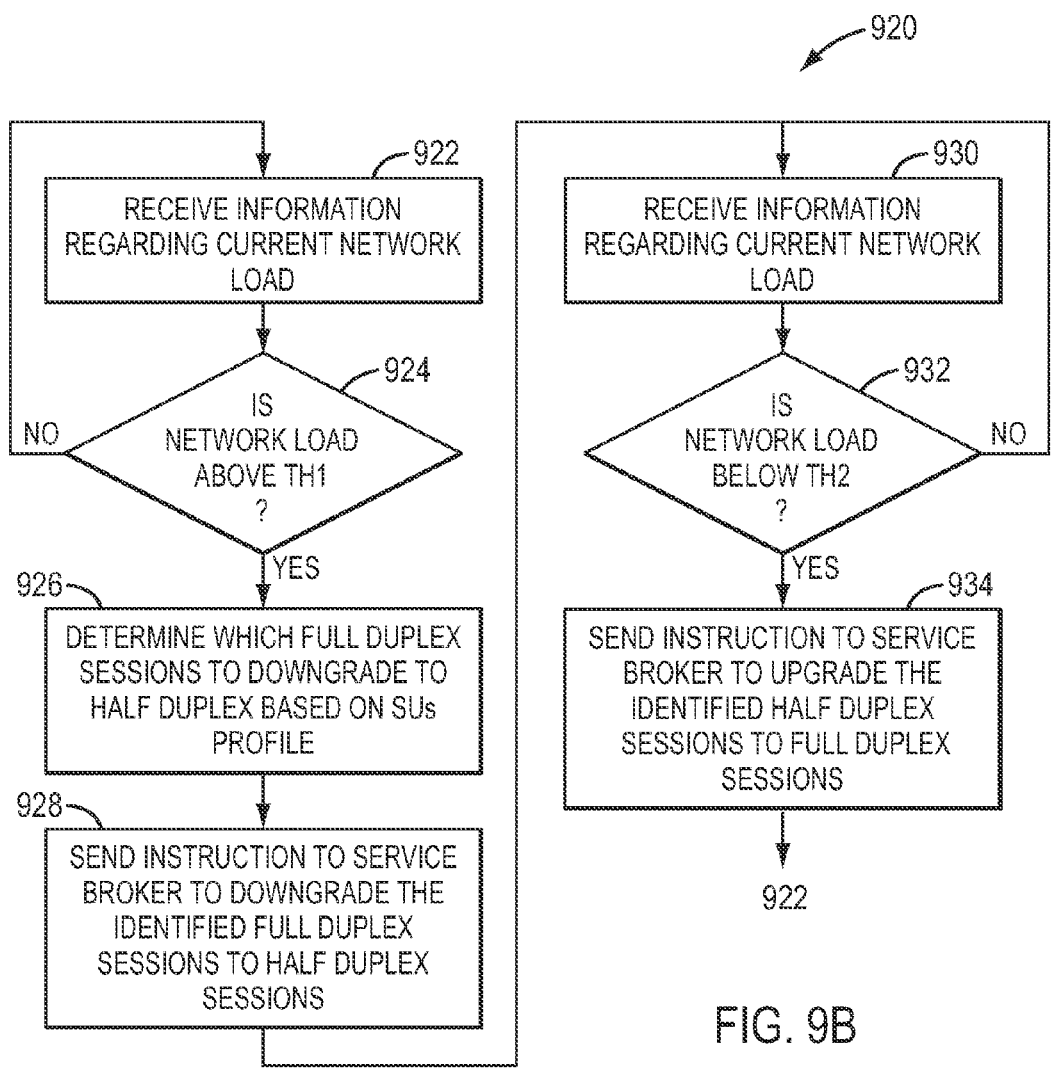
FIG. 9B illustrates a block diagram of an exemplary method of assisting in the switching of a full duplex communication session to half duplex communication performed by the network load monitoring device in accordance with another embodiment of the invention.

FIG. 9B illustrates a block diagram of an exemplary method 920 of assisting in the switching of a full duplex communication session to half duplex communication (and vice-versa) performed by the network load monitoring device 900 in accordance with another embodiment of the invention. According to the method 900, the processor 902 receives information regarding the current load of the communications network (which may include the base transceiver stations (BTS) as well as the links between the base transceiver stations (BTS) and the subscriber units (SU)) via the network interface 904 (block 922). The processor 902 then determines whether the current network load exceeds a first predetermined threshold TH1 (block 924). If the processor 902 determines that the current network load does not exceed the first predetermined threshold (TH1), the processor 902 continues to receive the current network load information in accordance with block 922.

If, on the other hand, the processor 902 determines that the network load exceeds the first predetermined threshold (TH1), the processor 902 then determines which full duplex sessions to downgrade to half duplex sessions based on the participating SUs' subscriber profile information (block 926). For example, if certain subscribers have paid for premium services, their full duplex sessions would not be downgraded to half duplex sessions. However, for subscribers that have paid for economy services, their full duplex sessions would be downgraded to half duplex session. The processor 902 can retrieve the subscription to the service package from the subscriber profile database. The processor 902 then sends an instruction to the service broker to downgrade the identified full duplex sessions to half duplex sessions (block 928). Alternatively, the processor 902 computes the number of sessions to be downgraded, and provides that information to the service broker.

The processor 902 continues to receive information regarding the current network load of the communications network via the network interface 904 (block 930). The processor 902 then determines whether the current network load falls below a second predetermined threshold (TH2) (block 932). This may be the case where the network load has improved to allow the downgraded sessions to be upgraded back to full duplex sessions. The second predetermined threshold (TH2) may be substantially the same or lower than the first predetermined threshold (TH1). If the processor 902 determines that the current network load has not fallen below the second predetermined threshold (TH2), the processor 902 continues to receive information regarding the current network load as per block 930. If, on the other hand, the processor 902 determines that the current network load has fallen below the second predetermined threshold (TH2), the processor 902 sends an instruction to the service broker to upgrade the identified half duplex sessions back to full duplex sessions (block 934). The method 920 proceeds back to block 922.

Figure 10A:
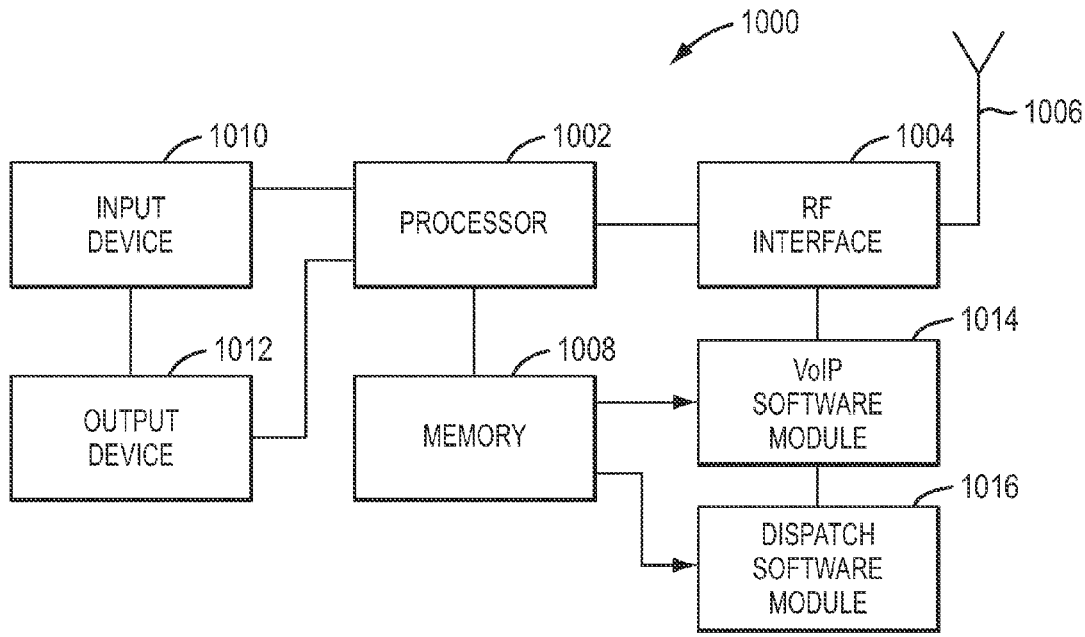
FIG. 10A illustrates a block diagram of an exemplary subscriber unit (SU) in accordance with another embodiment of the invention.

FIG. 10A illustrates a block diagram of an exemplary subscriber unit (SU) 1000 in accordance with another embodiment of the invention. The SU 1000 may be an exemplary detailed version of the SUs 150 and/or 160 previously discussed with reference to the wireless communication system 100. As detailed below, the SU 1000 initiates a switch from a full duplex communication session to a half duplex communication session, and responds to a request to switch from a full duplex communication session to a half duplex communication session.

In particular, the SU 1000 comprises a processor 1002, a radio frequency (RF) interface 1004 coupled to the processor 1002, an antenna 1006 coupled to the RF interface 1004, a memory 1008 coupled to the processor 1002, an input device 1010 coupled to the processor 1002, and an output device 1012 coupled to the processor 1002. The processor 1002, under the control of one or more software module(s), such as a VoIP software module 1014 and a dispatch software module 1016, stored in the memory 1008, performs the various operations of the SU 1000 such as initiating and responding to a switch of a full duplex communication session to a half duplex communication session. The RF interface 1004 including the antenna 1006 provides an interface to the wireless medium to send and receive communications to and from the wireless communication system 100. If the SU 1000 is a dispatch-to-desktop device, the RF interface 1004 and antenna 1006 may be instead a network interface.

The memory 1008 could be any computer readable medium (e.g., volatile or non-volatile memory) capable of storing one or more software module(s), such as the VoIP software module 1014 and the dispatch software module 1016, that controls the processor 1002 in performing its various operations. The software modules 1014 and 1016 could be based on any programming language, such as Java, C, C++, etc. The input device 1010 allows a user to provide instruction and information to the processor 1002, and may include a keyboard, pointing device, microphone, etc. The output device allows the processor 1002 to send instructions and information to the user, and may include a display, speaker, vibrating unit, etc. The following describes a couple of exemplary methods of initiating a switch from a full duplex session to a half duplex session, and an exemplary method of responding to a request to switch from a full duplex session to a half duplex session.

Figure 10B:
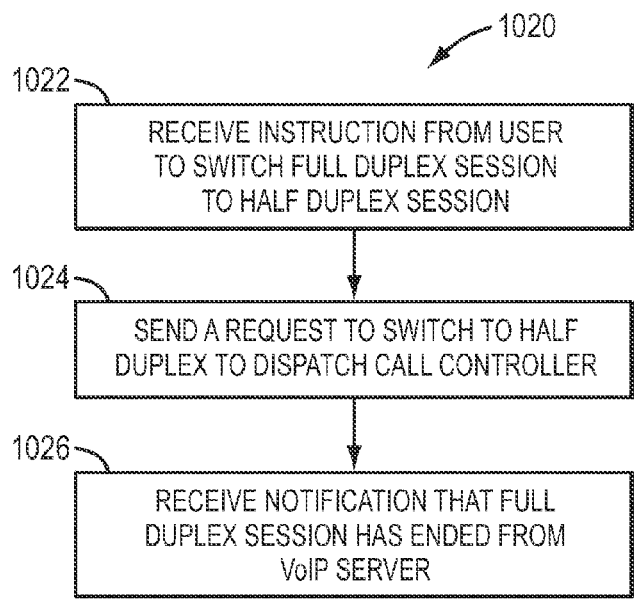
FIG. 10B illustrates a block diagram of an exemplary method of initiating a switch from a full duplex communication session to a half duplex communication session performed by the subscriber unit (SU) in accordance with another embodiment of the invention.

FIG. 10B illustrates a block diagram of an exemplary method 1020 of initiating a switch from a full duplex communication session to a half duplex communication session performed by the SU 1000 in accordance with another embodiment of the invention. In this example, the SU 1000 is currently in a full duplex session with another target unit. In addition, the SU 1000 is initiating a switch from the full duplex session to a half duplex session. According to the method 1020, the processor 1002 receives an instruction to switch to a half duplex session from the user via the input device 1010 (block 1022). The VoIP software module 1014 may process the request to switch to a half duplex session. In response, the processor 1002 sends a request to switch to a half duplex session to the dispatch call controller 104 by way of the RF interface 1004 and antenna 1006 (block 1024). In this respect, the VoIP software module 1014 contacts the dispatch software module 1016 to send the request to the dispatch call controller 104.

When the dispatch call controller 104 of the wireless communication system 100 has set up the requested half duplex communication session and the VoIP server 110 thereafter terminates the full duplex communication session, the processor 1002 receives a notification that the full duplex session has been terminated from the VoIP server 110 via the antenna 1006 and RF interface 1004 (block 1026). The processor 1002 may notify the user of the ending of the full duplex session via the output device 1012. The VoIP software module 1014 may be responsible for generating this notification.

Figure 10C:
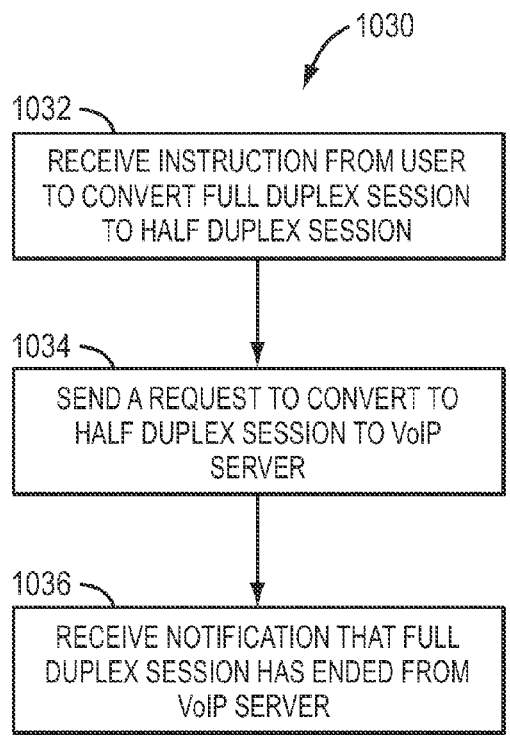
FIG. 10C illustrates a flow diagram of another exemplary method of initiating a switch from a full duplex communication session to a half duplex communication session performed by the subscriber unit (SU) in accordance with another embodiment of the invention.

FIG. 10C illustrates a flow diagram of another exemplary method 1030 of initiating a switch from a full duplex communication session to a half duplex communication session performed by the SU 1000 in accordance with another embodiment of the invention. In this example, the SU 1000 is currently in a full duplex session with another target unit. In addition, the SU 1000 is initiating a switch from the full duplex session to a half duplex session. According to the method 1030, the processor 1002 receives an instruction to switch to a half duplex session from the user via the input device 1010 (block 1032). In response, the processor 1002 sends a request to switch to a half duplex session to the VoIP server 110 by way of the RF interface 1004 and antenna 1006 (block 1034). The VoIP software module 1014 may be responsible for performing the operations specified in blocks 1032 and 1034.

When the VoIP server 110 has received an acceptance from the target SU, forwards an instruction to the dispatch call controller 104 to set up the half duplex communication session, and terminates the full duplex session, the processor 1002 receives a notification that the full duplex session has been terminated from the VoIP server 110 via the antenna 1006 and RF interface 1004 (block 1036). The processor 1002 may notify the user of the ending of the full duplex session via the output device 1012. The VoIP software module 1014 may be responsible for generating this notification. The VoIP software module 1014 may also notify the dispatch software module 1016 of the request.

Figure 10D:
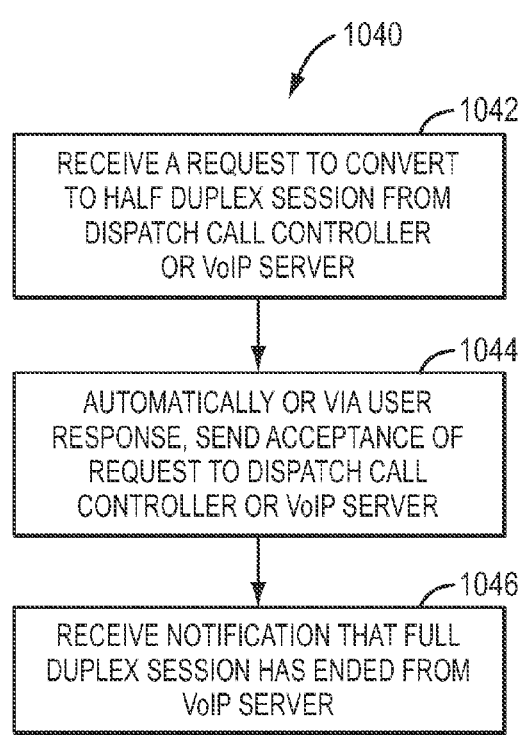
FIG. 10D illustrates a flow diagram of another exemplary method of responding to a request to switch from a full duplex communication session to a half duplex communication session performed by the subscriber unit (SU) in accordance with another embodiment of the invention.

FIG. 10D illustrates a flow diagram of another exemplary method 1040 of responding to a request to switch from a full duplex session to a half duplex session performed by the SU 1000 in accordance with another embodiment of the invention. In this example, the SU 1000 is currently in a full duplex session with another unit. In addition, the SU 1000 is receiving a request to switch from the full duplex session to a half duplex session from the other unit.

According to the method 1040, the processor 1002 receives a request to switch to a half duplex session from the dispatch call controller 104 or the VoIP server 110 via the antenna 1006 and RF interface 1004 (block 1042). The VoIP software module 1014 is responsible for processing the request when the request is received from the VoIP server 110. The dispatch software module 1016 is responsible for processing the request when received from the dispatch call controller 104. Depending upon whether the configuration setting is for automatic or manual acceptance, the processor 1002 may automatically or via a user instruction send an acceptance of the request to the dispatch call controller 104 or the VoIP server 110 via the RF interface 1004 and antenna 1006 (block 1044). In the case of sending the acceptance to the dispatch call controller 104, the dispatch software module 1016 notifies the VoIP software module 1014 of the acceptance of the request. Similarly, in the case of sending the acceptance to the VoIP server 110, the VoIP software module 1014 notifies the dispatch software module 1016 of the acceptance of the request. The processor 1002 then receives a notification of the termination of the full duplex session from the VoIP server 110 via the antenna 1006 and RF interface 1004 (block 1046). The processor 1002 may notify the user of the ending of the full duplex session via the output device 1012. The VoIP software module 1014 is responsible for this operation.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A communication system, comprising:
   a network;
   a first network device coupled to said network, wherein said first network device is adapted to set up a full duplex communication session between first and second subscriber units (SUs);
   a second network device coupled to said network; and
   a third network device coupled to said network, wherein said third network device is adapted to:
      monitor a network traffic load of said network; and
      if said network traffic load exceeds a first predetermined threshold, send a message to instruct said second network device to set up a half duplex communication session between said first and second subscriber units (SUs); and
      send a message to instruct said first network device to terminate said full duplex communication session.

2. The communication system of claim 1, further comprising a fourth network device adapted to:
   receive an instruction from said third network device to downgrade a certain number of full duplex communication sessions to half duplex communication sessions; and
   determine which full duplex communication sessions to downgrade to half duplex communication sessions, one of which being said full duplex communication session between said first and second subscriber units (SUs);
   send an instruction to said first network device to terminate said selected full duplex communication sessions;
   send an instruction to said second network device to set up half duplex communication sessions to replace said terminated full duplex communication sessions.

3. The communication system of claim 1, wherein if said network traffic load of said network falls below a second predetermined threshold, said third network device is further adapted to:
   cause said first network device to set up another full duplex communication session between said first and second subscriber units; and
   cause said second network device to terminate said half duplex communication session.

4. The communication system of claim 1, wherein said first predetermined threshold is different than said second predetermined threshold.

5. A method, comprising:
   setting up a full duplex communication session by a first network device between first and second subscriber units;
   monitoring by a second network device a network traffic load of a network through which said full duplex communication session is established; and
   terminating said full duplex communication session according to instructions set by the second network device and setting up a half duplex communication session between said first and second subscriber units by a third network device if said network traffic load exceeds a first predetermined threshold.

6. The method of claim 5, further comprising setting up another full duplex communication session between said first and second subscriber units, and terminating said half duplex communication session if said network traffic load falls below a second predetermined threshold.

7. The method of claim 5, wherein said first predetermined threshold is different than said second predetermined threshold.

8. A communication system, comprising:
   a network;
   a first network device coupled to said network, wherein said first network device is adapted to set up a full duplex communication session between first and second subscriber units (SUs);
   a second network device coupled to said network; and
   a third network device coupled to said network, wherein said third network device is adapted to:
      monitor a network traffic load of said network;
      determine a quality of service (QoS) associated with said first and/or second subscriber units (SUs); and
      if said network traffic load exceeds a predetermined network load threshold and said QoS is below a predetermined QoS threshold, send instructions to change the full duplex communication session to a half duplex communication session to a fourth network device; and
   wherein said fourth network device, in response to said message, is adapted to:
      instruct said second network device to set up a half duplex communication session between said first and second subscriber units (SUs); and
      instruct said first network device to terminate said full duplex communication session.

9. The communication system of claim 8, wherein said fourth network device is adapted to:
   receive an instruction from said third network device to downgrade a certain number of full duplex communication sessions to half duplex communication sessions; and
   determine which full duplex communication sessions to downgrade to half duplex communication sessions, one of which being said full duplex communication session between said first and second subscriber units (SUs);
   send an instruction to said first network device to terminate said selected full duplex communication sessions;
   send an instruction to said second network device to set up half duplex communication sessions to replace said terminated full duplex sessions.

10. A method, comprising:
    setting up a full duplex communication session by a first network device between first and second subscriber units;
    monitoring by a second network device a network traffic load of a network through which said full duplex communication session is established;
    determining by the second network device a quality of service (QoS) associated with said first and/or second subscriber units (SUs); and
    terminating said full duplex communication session according to instructions sent from the second network device and setting up a half duplex communication session between said first and second subscriber units by a third network device if said network traffic load exceeds a predetermined network load threshold and said QoS is below a predetermined QoS threshold.

* * * * *